R. SNODGRASS.
LID LIFTER.
APPLICATION FILED FEB. 7, 1911.
1,010,196.
Patented Nov. 28, 1911.
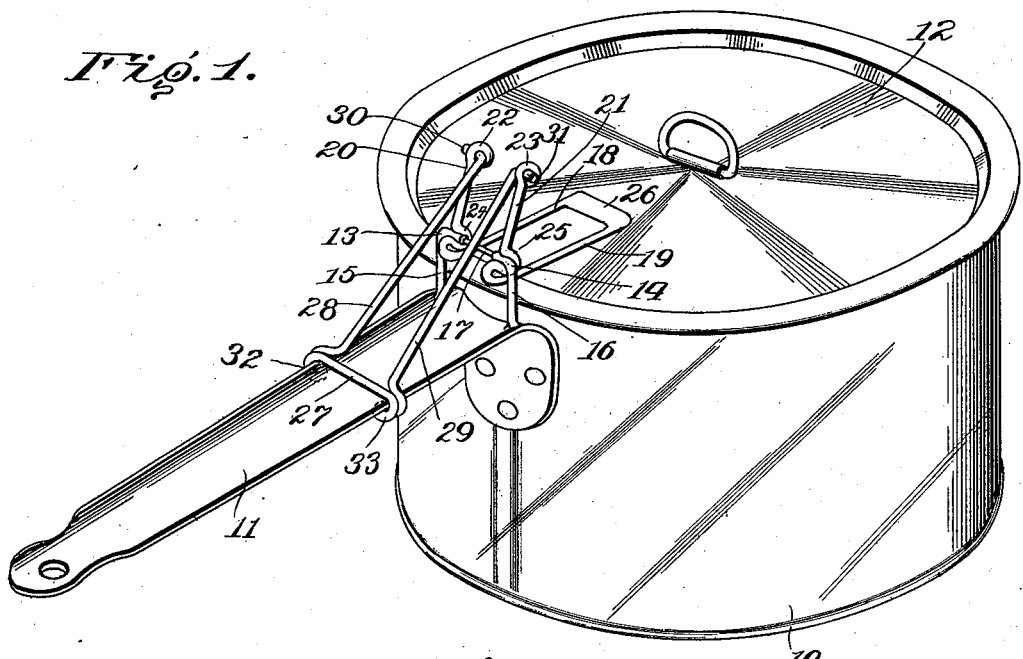
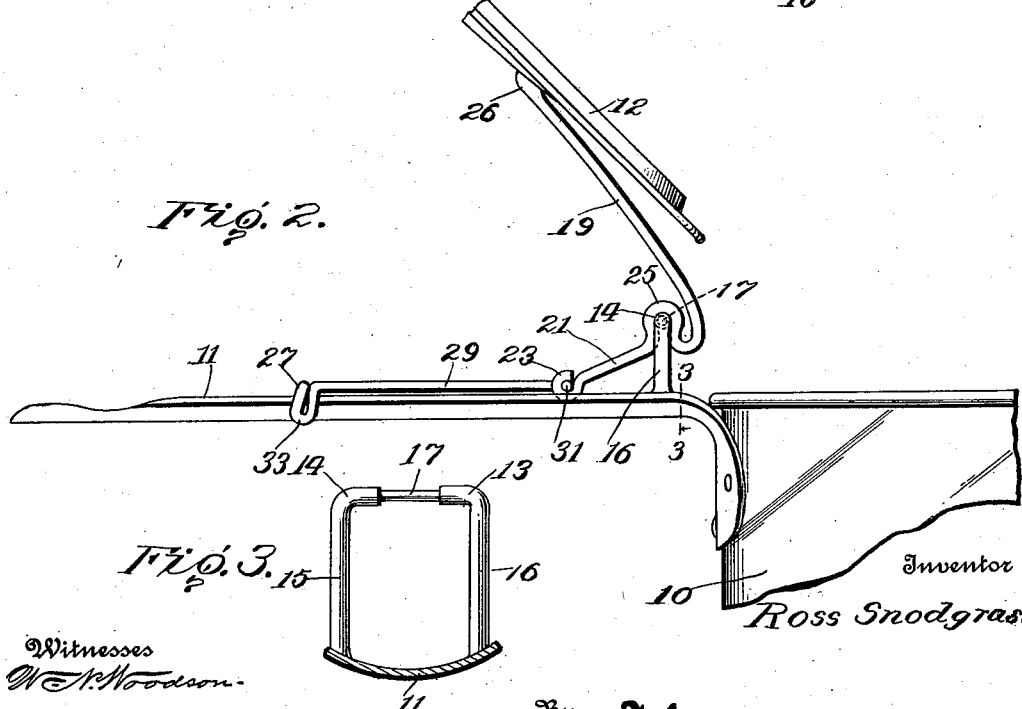
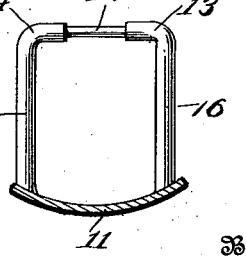
Witnesses
Inventor
Ross Snodgrass

UNITED STATES PATENT OFFICE.

ROSS SNODGRASS, OF JACKSONBURG, WEST VIRGINIA.

LID-LIFTER.

1,010,196.  Specification of Letters Patent.  Patented Nov. 28, 1911.

Application filed February 7, 1911. Serial No. 607,130.

*To all whom it may concern:*

Be it known that I, ROSS SNODGRASS, citizen of the United States, residing at Jacksonburg, in the county of Wetzel and State of West Virginia, have invented certain new and useful Improvements in Lid-Lifters, of which the following is a specification.

This invention relates to lid lifters, and has for one of its objects to provide a simply constructed device whereby the lid or cover of a vessel may be readily elevated and locked in its open or elevated position without the necessity for touching the lid or cover with the hands.

Another object of the invention is to provide a simply constructed device of this character which may be readily disconnected to enable the cover and the lifting mechanism to be detached.

Another object of the invention is to provide a device of this character which may be readily detached when the vessel is to be used without a lid or cover.

With these and other objects in view the invention consists in certain novel features of construction as hereafter shown and described and then specifically pointed out in the claims, and in the drawings illustrative of the preferred embodiment of the invention, Figure 1 is a perspective view of the improved device in closed position; Fig. 2 is a side elevation of a portion of a vessel and its handle and a portion of the cover showing the improved device in open position; Fig. 3 is an enlarged section on the line 3—3 of Fig. 2, with the elevating mechanism detached.

Corresponding and like parts are referred to in the following description and indicated in all the views of the accompanying drawings by the same reference characters.

The improved device may be applied without material structural changes to any size or form of cooking vessel which is provided with a lateral handle, such as saucepans, stew pans, and the like, and it is not desired therefore to limit the improved device to any specific size or form of vessel. The improved device is designed more particularly for use in connection with graniteware cooking utensils of the stew pan or saucepan form, and for the purpose of illustration is shown applied to a conventional vessel of this character, in which 10 represents the body, 11 the lateral handle, and 12 the cover, of the usual construction. The handle 11 is generally formed with the sides slightly converging or tapering toward the outer end and curved downwardly transversely, as shown.

The improved device comprises two bearings 13—14 spaced apart and located above the handle near its juncture with the body 10. The bearings are preferably formed as a part of a relatively heavy U shaped wire loop which includes vertical sides 15—16, with the bearings 13—14 at the bends of the loop and with the portion of the wire between the bearings reduced, as shown at 17.

Connected to the cover 12 is an arm or hinged member, preferably formed of a single piece of wire, and including spaced sides 18—19 with the outer portions upturned, as shown at 20—21 and having terminal eyes 22—23. The side 18—20 of the arm is provided with an open loop 24, while the side 19—21 is provided with a similar open loop 25, the entrances to the loops being of less diameter than the bearings 13—14 and of greater diameter than the reduced portion 17. The hinge member just described is connected at its bend, at 26, to the cover 12, as shown, and is rigidly supported upon the cover. The hinge member is formed of resilient material, preferably wire, and the sides 18—19 together with the upwardly extending portion 20—21 are therefore compressible to enable the reduced throats of the loops 24—25 to be passed over the reduced portion 17 which extends between the bearings, and then when the sides 18—19 are released the reaction of the side members 20—21 of the hinge member will move the loops 24—25 into engagement with the larger bearings 13—14. By this means the cover is swingingly connected to the handle and is removable therefrom only by compressing the sides of the hinge member. The cover will thus be retained in hinged relation to the handle. Another arm is slidably engaged with the handle and is preferably formed from a single piece of wire and comprises a lateral loop 27 and spaced sides 28—29, the sides having outturned terminals 30—31 at their free ends. The terminals of the loop 27 are bent inwardly, as shown at 32—33, for engagement beneath the side edges of the handle 11. By this arrangement it will be obvious that the loop 27 with its inturned terminals 32—33 slidably engages over the handle 11, while the outturned terminals 30—31 of the sides 28—29 are in position to be engaged with the eyes 22—23 of the arm of the cover, as shown in Figs. 1 and 2. By this arrangement it will be obvious that when the slide device is applied the operator by grasping the handle with the fingers of one hand and engaging the loop 27 with the thumb can draw the slide member outwardly and thus elevate the cover 12 into the position shown in Fig. 2, with the sides 28—29 lying close to the upper face of the handle 11. When in this position the eyes 22—23 lie below a line drawn between the bearings 13—14 and the loop 27 so that the cover is locked in its open position, but can be readily closed by moving it slightly toward its closed position, or sufficiently to elevate the eyes 22—23 above a line drawn through the bearings 13—14 and the loop 27.

It will thus be obvious that a simply constructed and convenient device is produced, which may be readily applied without material structural changes to saucepans and similar vessels of various sizes, and enables a chef to handle the cover 12 without danger of burning the fingers, while at the same time the cover may be readily detached if it is not required, or when washing the vessel.

Having thus described the invention, what is claimed as new is:—

1. A vessel having a laterally extending handle, bearings carried by said handle and spaced apart, a cover for said vessel, an arm carried by said cover and including spaced side members each having an open loop for detachable engagement respectively with said bearings, and another arm slidable upon said handle and detachably engaging the arm of the cover.

2. A vessel having a laterally extending handle, bearings carried by said handle and spaced apart, a cover for said vessel, an arm carried by said cover and including spaced side members each having a terminal eye and an open loop, said loops adapted for detachable engagement respectively with said bearings, and another arm slidable upon said handle and including spaced side members having outwardly directed terminals adapted to yieldably engage the eyes of the arm of said cover.

In testimony whereof, I affix my signature in presence of two witnesses.

ROSS SNODGRASS. [L. S.]

Witnesses:
ROBT. S. JAMES,
W. B. LOWE.

---

Copies of this patent may be obtained for five cents each, by addressing the "Commissioner of Patents, Washington, D. C."